(12) United States Patent
Biel et al.

(10) Patent No.: US 8,387,782 B2
(45) Date of Patent: Mar. 5, 2013

(54) CONTAINER FOR THE ACCOMMODATION OF A CONTACT LENS

(75) Inventors: Roger Biel, Aschaffenburg (DE); Katrin Sylke Lorenz, Darmstadt (DE); Adrian Michael Woodward, Suffolk (GB); James Robert Stirling Howarth, Cambridge (GB)

(73) Assignee: Novartis AG, Basel (CH)

( * ) Notice: Subject to any disclaimer, the term of this patent is extended or adjusted under 35 U.S.C. 154(b) by 134 days.

(21) Appl. No.: 12/904,185

(22) Filed: Oct. 14, 2010

(65) Prior Publication Data

US 2011/0089053 A1  Apr. 21, 2011

Related U.S. Application Data

(60) Provisional application No. 61/252,485, filed on Oct. 16, 2009.

(51) Int. Cl.
*A45C 11/04* (2006.01)
(52) U.S. Cl. .......................................... 206/1.5; 134/901
(58) Field of Classification Search .................. 206/5.1, 206/210; 134/184, 186, 137, 901; 422/300
See application file for complete search history.

(56) References Cited

U.S. PATENT DOCUMENTS

| | | | | |
|---|---|---|---|---|
| 3,054,412 A | * | 9/1962 | Nickell | 134/137 |
| 4,662,360 A | * | 5/1987 | O'Hara et al. | 600/200 |
| 4,721,124 A | * | 1/1988 | Tuerkheimer et al. | 134/138 |
| 4,782,946 A | * | 11/1988 | Pollak | 206/223 |
| 5,036,971 A | * | 8/1991 | Seden et al. | 206/5.1 |
| 5,080,839 A | | 1/1992 | Kindt-Larsen | |
| 5,316,700 A | * | 5/1994 | Soye et al. | 264/1.1 |
| 5,343,861 A | * | 9/1994 | Herman | 600/406 |
| 5,476,111 A | | 12/1995 | Andersen | |
| 5,640,980 A | | 6/1997 | Keene | |
| 5,690,866 A | * | 11/1997 | Andersen et al. | 264/2.6 |
| 5,762,081 A | | 6/1998 | Keene | |

(Continued)

FOREIGN PATENT DOCUMENTS

| | | |
|---|---|---|
| EP | 0453231 A2 | 10/1991 |
| EP | 0686488 A2 | 12/1995 |

(Continued)

OTHER PUBLICATIONS

PCT International Search Report dated Jan. 12, 2011, International Application No. PCT/EP2010/065440, International Filing Date Oct. 14, 2010.

(Continued)

*Primary Examiner* — David Fidei
(74) *Attorney, Agent, or Firm* — Robert Ambrose

(57) ABSTRACT

There is described a container (1) for the accommodation of a contact lens during treatment process such as extraction and/or rinsing and/or coating processes, which comprises an elongated tubular body (2) having a sidewall (3) and at one longitudinal end thereof a bottom (4) which protrudes convexly towards the outside of the tubular body (2). At the opposite longitudinal end the tubular body (2) has an access opening (5). The bottom (4) is provided with a number of apertures (41, 42) which enable a free flow of a liquid into and out of the tubular body (2). A retaining element (6) is located inside the tubular body (2), which allows access of a transfer means into the tubular body (2) towards the bottom (4) thereof for insertion and removal of a contact lens, and enables a free rising of the liquid inside the tubular body (2), but prohibits the contact lens from being washed out of the tubular body (2).

16 Claims, 2 Drawing Sheets

U.S. PATENT DOCUMENTS

| | | | |
|---|---|---|---|
| 5,836,323 A | 11/1998 | Keene | |
| 6,012,471 A | 1/2000 | Calvin | |
| 6,071,112 A | 6/2000 | Calvin | |
| 6,581,761 B1 | 6/2003 | Stafford | |
| 6,811,398 B2 * | 11/2004 | Bennett | 433/25 |
| 6,868,963 B2 * | 3/2005 | Borovsky | 206/5.1 |
| 7,147,826 B2 * | 12/2006 | Haywood et al. | 422/547 |
| 8,042,683 B2 * | 10/2011 | Knox | 206/5.1 |
| 2003/0222362 A1 | 12/2003 | Indra | |
| 2004/0074525 A1 * | 4/2004 | Widman et al. | 134/34 |
| 2004/0140229 A1 | 7/2004 | Borovsky | |

FOREIGN PATENT DOCUMENTS

| | | |
|---|---|---|
| WO | 0132408 A2 | 5/2001 |
| WO | 2004065231 A2 | 8/2004 |

OTHER PUBLICATIONS

PCT Written Opinion of the International Searching Authority dated Jan. 12, 2011, International Application No. PCT/EP2010/065440, International Filing Date Oct. 14, 2010.

\* cited by examiner

CONTAINER FOR THE ACCOMMODATION OF A CONTACT LENS

This application claims the benefit under 35 U.S.C. §119(e) of U.S. provisional application Ser. No. 61/252,485, filed on Oct. 16, 2009, incorporated herein by reference in its entirety.

FIELD

The invention relates to a container for the accommodation of a contact lens during extraction and/or rinsing and/or coating.

BACKGROUND

It is well established in the art to produce hard and soft contact lenses in an automated production process with reusable moulds. Depending on the material from which the contact lens is made, and in accordance with the production method applied the contact lens must be immersed in treatment fluids or solutions, for example extraction solutions, and/or rinsing solutions and/or coating solutions in order to obtain the desired product, which may be worn in direct contact with the customer's eyes. During these process steps it must be ascertained that the entire contact lens is sufficiently wetted with the respective solution and that enough fresh solution comes into contact with the lens during the treatment time. On the other hand it must be avoided that the surfaces and/or the edge of the contact lens are affected in an adverse manner during treatment, or that the entire contact lens even gets lost in one of the solution baths.

It is therefore an object of the present invention to provide a container for the accommodation of a contact lens during treatments, for example extraction and/or rinsing and/or coating processes in which the contact lens is safely and gently retained, but at the same time is freely exposed to the treatment solution(s). The container enables an easy insertion into and removal of the contact lens from the container during the production process using automated transfer means and tools. A re-usable container shall be provided which is capable of being manufactured in a reproducible process, yielding containers with identical or essentially identical properties, in order to ascertain that the contact lenses accommodated therein during an automated production process are subjected to identical conditions. Preferably the container shall be capable of being manufactured by well established mass production processes.

SUMMARY

These and still further objects are met by a container for the accommodation of a contact lens having at least the features listed in patent claim 1. Further improvements of the invention and preferred embodiments are subject of the therefrom dependent claims.

In accordance with the invention a container for the accommodation of a contact lens during a treatment such as extraction and/or rinsing and/or coating is provided which comprises an elongated tubular body having a sidewall and at one longitudinal end thereof a bottom which protrudes convexly towards the outside of the tubular body. At the opposite longitudinal end the tubular body has an access opening. The bottom is provided with a number of apertures which enable a free passage of a liquid into and out of the tubular body. A retaining element is located inside the tubular body, which allows access of a transfer means into the tubular body towards the bottom thereof for insertion and removal of a contact lens, and enables a free rising of the liquid inside the tubular body, but prohibits the contact lens from being washed out of the tubular body.

The shape of the tubular container is selected in accordance with the automated production process for the contact lens. The tubular body alleviates the handling of the container, which, when gripped or held near its access opening, displays a tendency of self-alignment due to gravity. The bottom, which curves convexly towards the outside of the tubular body, at the inside thereof forms a concave support for the contact lens. It has been found previously that a contact lens, when inserted into and immersed in a liquid bath, for example water or an aqueous solution, tends to orient itself with its convex side facing downwards. Further, it is known, that contact lenses typically have a density at least slightly higher than that of water and many or most aqueous solutions. Therefore, once completely immersed a contact lens has the tendency to sink towards a concave bottom of the tubular body. The apertures in the bottom of the tubular body enable a free flow of liquid into and out of the tubular body, when the container is inserted into a liquid bath and agitated therein. The retaining element allows a circulation of the liquid inside the agitated tubular body, but inhibits or prohibits that an inserted contact lens, which is freely floating in the enclosed space in between the bottom of the tubular body and the retaining element, from being washed out of the container. On the other hand the retaining element allows an access of a transfer means into the enclosed space towards the bottom of the tubular body of the container, in order to insert or to remove a contact lens.

Thus, with the container according to the invention a tool is provided, which ensures that a contact lens is completely immersed and wetted during treatment, e.g., during extraction and/or rinsing and/or coating process. The container is re-usable and is compatible with the automated production process for the contact lenses. The container is simple in construction and capable of being reproducibly manufactured in mass production processes. Thus, it is ensured that all contact lenses accommodated in the container according to the invention are subjected to practically identical conditions during the liquid treatment processes.

In an embodiment of the invention the retaining element comprises a diaphragm having flexible fins which extend from a circumference towards the center thereof. The flexible fins enable an easy insertion of a transfer means such as, e.g., a vacuum gripper or like tool for the insertion and removal of a contact lens. Upon insertion of the transfer means the fins are bent towards the bottom of the tubular body. Due to their inherent flexibility the fins move back to their original retaining position after the transfer means has been withdrawn. The flexibility of the fins is selected such, that they may be easily bent when the transfer means is inserted, but that they do not bend due to the liquid caused by the agitation of the container, e.g. by periodically moving the container up and down inside the liquid bath.

A very convenient and easy manner of forming the fins of the retaining element is accomplished by providing the diaphragm with diagonally extending slots.

The container according to the invention is used for an accommodation of a contact lens in treatment processes such as, for example, extraction and/or rinsing and/or coating processes. In order to reduce the amount of entrained liquid in the container when the container is transported from one bath to the next or to a subsequent treatment station the fins are inclined towards the bottom of the tubular body. In a still further embodiment of the invention the entrainment of liquid is further reduced by providing the fins with throughholes which enable a free flow of the liquid from the upper side of the fins towards the bottom of the tubular body, where it may return into the liquid bath through the apertures in the bottom of the tubular body.

The retaining element is produced separately from the tubular body of the container. For a better handling thereof, in another embodiment of the invention the retaining element comprises a circumferential portion, from which there extends the diaphragm. In the mounted state, the circumferential portion rests against the inside of the side wall of the tubular body. The circumferential portion is of a cylindrical shape and has preferably a circular cross section in order to match the cross section of the tubular body, which is preferably cylindrical too.

In order to ascertain that the mounted retaining element is held securely in place in a further embodiment of the invention the circumferential portion is provided with at least two lugs which protrude from the circumference thereof and, in the mounted state, lock in corresponding apertures in the sidewall of the tubular body.

The mounting of the retaining element in the container may be facilitated by providing the inside wall of the tubular body with an annular shoulder for axially supporting the circumferential portion of the retaining element.

In order to enhance the flow of liquid into and out of the container the apertures in the bottom of the tubular body comprise throughholes and longitudinal slots, which extend from a transition region of the bottom into the cylindrical wall of the tubular body, towards the retaining element. By this design it is ascertained that upon agitation of the container within the liquid bath the liquid flows into and out of the tubular body from all sides of the contact lens, which is freely floating in the enclosed space in between the retaining element and the bottom of the tubular body.

In order to establish favorable flow conditions and proper exposure of the contact lens to fresh treatment liquid in another embodiment of the invention the total area of the longitudinal slots at least corresponds to an area covered by the throughholes in the convex bottom.

In order facilitate the transport of the container with automated transport means the longitudinal end of the tubular body surrounding the access opening is provided with an annular flange. The annular flange allows a simple insertion of the tubular body of the container into an opening of a transport carrier for a number of like containers. The flange prohibits that the tubular body from slipping through this opening.

The container may be further secured in such a carrier by providing the sidewall of the tubular body, underneath the annular flange with at least two resilient locking tabs which interact with corresponding locking means on the carrier. Thus, a secure seat of the container is ascertained even when it is agitated in a liquid bath.

In order to allow an easy and reproducible manufacture of the container according to the invention in a mass production process the tubular body is made from a moldable plastic material, for example polyolefins or polyesters, or other known suitable moldable plastic materials, or mixtures thereof. An advantageous polyolefin which is compatible with the liquids used in the treatment of contact lenses is polypropylene. In accordance with the requirements of the treatment processes, e.g., extraction and/or rinsing and/or coating processes, and the solutions applied therein, other materials may be used for the manufacture of the tubular body.

Established mass production processes for the tubular body are, e.g., injection molding, impact extrusion, or blow molding. In particular in cases of multi-layered tubular bodies blow molding proves to be a very convenient and inexpensive production method.

In an embodiment of the invention the retaining element is manufactured separately from the tubular body. The material for the retaining element is selected in accordance with the solutions and chemicals used for the liquid treatment of the contact lenses and also depending on the mechanical (elastic) properties thereof. It proves that an advantageous material which satisfies both, chemical and mechanical requirements, is Silicon.

In a still further embodiment of the invention the retaining element forms an integral part of the tubular body. Thus, it may be manufactured in a two-component injection molding process. This allows an even more time- and cost-efficient manufacture of the container.

These and still further features of the container will become apparent from the following description of an exemplary embodiment of the invention, reference being made to the schematic drawings which are not to scale, in which:

DETAILED DESCRIPTION

The following description of an exemplary embodiment of the invention is for illustrative purposes only and is not intended to limit of the scope of the invention.

Figure 1:
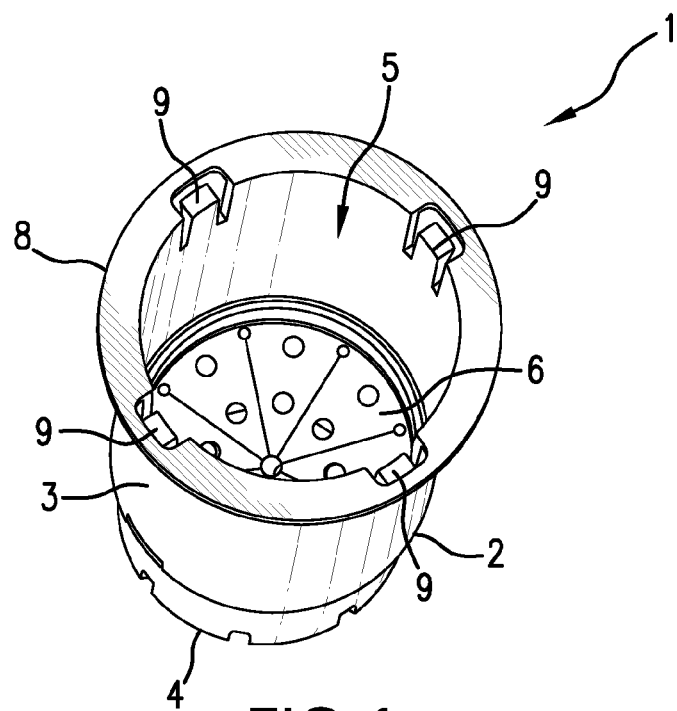
FIG. 1 is a perspective view of the container from above.
Figure 2:
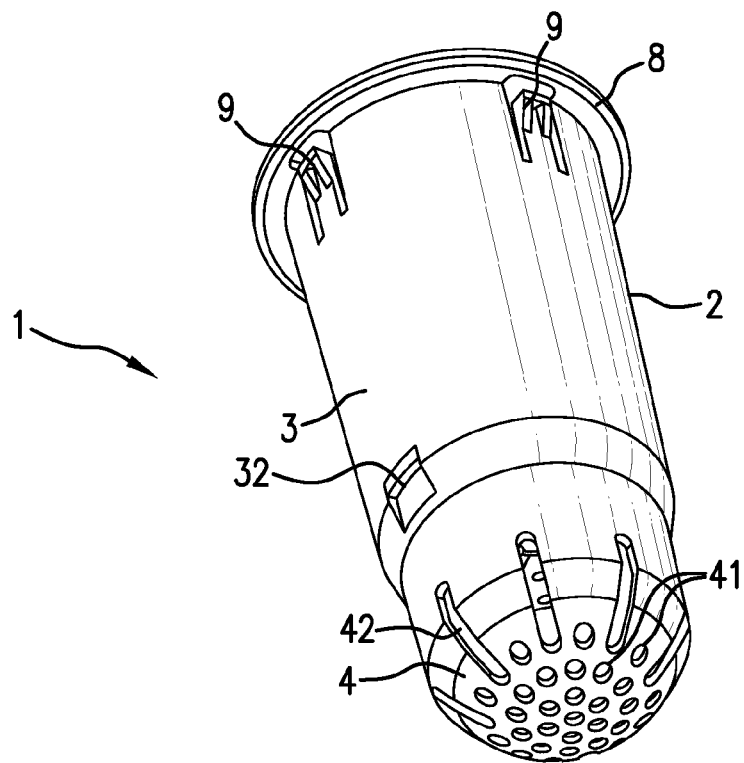
FIG. 2 is a perspective view of the container from underneath.

FIGS. 1 and 2 show perspective views of an embodiment of a container according to the invention which is generally designated with reference numeral 1. The container 1 comprises a tubular body 2, which preferably has a circular cross section. The tubular body 2 is of generally cylindrical configuration with a sidewall 3 and bottom 4, which convexly bulges outwardly. At the end opposite to the bottom 4 the tubular body 2 has an access opening 5 which is surrounded by an annular flange 8. At least two, according to the depicted embodiment (FIG. 1) four, resilient locking tabs 9 are provided in the cylindrical sidewall 3 of the tubular body 2, underneath the annular flange 8. The annular flange 8 and the locking tabs 9 serve for a secure attachment of the container 1 to an automatic transport carrier. Such a transport carrier may comprise e.g. an elongated bar with an upper and a lower surface and having a number of throughbores, the diameter of which is large enough to enable an easy insertion of a container 1 into each throughbore. The annular flange 8 surrounding the access opening 5 of an inserted tubular body 2 rests against the upper surface of the elongated bar and prohibits the container 1 from slipping through. Due to gravity the container 1 aligns itself automatically, hanging from the elongated bar in an about vertical position. The resilient locking tabs 9 right underneath the annular flange 8 bear against the lower surface of the elongated bar and prohibit a lifting of the container when it is agitated in an up and down manner during its transport through a liquid bath or from one treatment station to another.

The bottom 4 of the container 1 is provided with a number of apertures 41 and with slots 42, which extend across a transition region from the bottom 4 to the tubular body 2 of the container 1. A total area covered by the longitudinal slots 41 corresponds to at least about the total area covered by the bore-like apertures 41 in the convex bottom 4. In FIG. 1 a retaining element 6 is shown, which is securely attached inside the tubular body 2 by means of lugs which engage in corresponding apertures 32 in the sidewall 3 of the tubular body 2. The retaining element 6 comprises a diaphragm 61 with elastic flexible fins 62, which are of about triangular shape and extend radially from the circumference to the center of the diaphragm 61.

Figure 3:
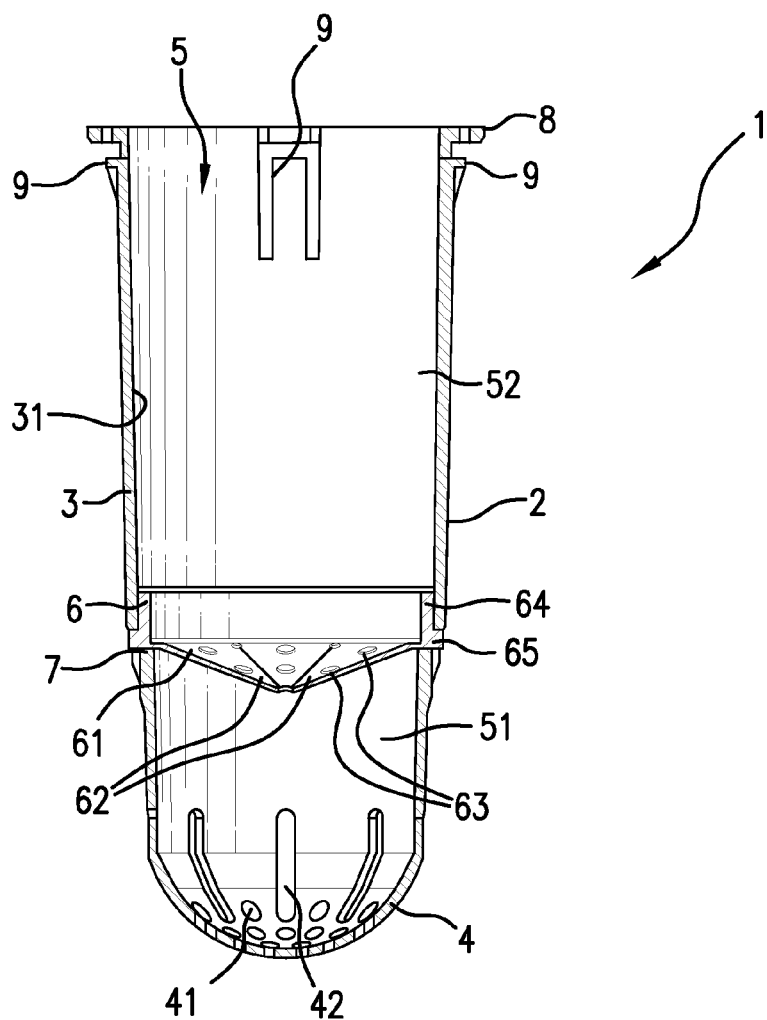
FIG. 3 is a longitudinally sectioned view of the container.

FIG. 3 shows a sectional view of the container 1. Like reference numerals designate like elements as in FIGS. 1 and 2. As can be seen from FIG. 3, the retaining element 6 separates the inside of the tubular body 2 into an upper chamber 52, which is open at the access opening 5 and a lower chamber 51 which is delimited axially by the convex bottom 4 of the tubular body 2 and by the retaining element 6. The retaining element 6 comprises a circumferential portion 64 which is matched to the shape of the inside wall of 31 of the sidewall 3. Since the shape of the inside wall 31 is preferably cylindrical, so is the shape of the circumferential portion 64 of the retaining element 6. The circumferential portion 64 of the retaining element 6 rests against an annular shoulder 7 which is provided at the inside wall 31 of the tubular body 2. Lugs 65, which protrude radially from the circumference of the circumferential portion 64 engage in the apertures 32 in the sidewall 3 (FIG. 2). Thus, the retaining element 6, which is manufactured separately from the tubular body 2 of the container 1, may simply be inserted into the tubular body 2 until it abuts the annular shoulder 7 and the lugs 65 engage in the apertures 32 in the sidewall 3. Thereby the retaining element 6 is secured against falling out.

From FIG. 3 it is apparent that the diaphragm 61 of the retaining element 6 has about a conical shape. The retaining element is mounted such, that the diaphragm 61 extends beyond the annular shoulder 7 towards the bottom 4 of the tubular body 2. The flexible fins 62 are inclined towards the bottom 4. This configuration allows an easier flexing and bending of the fins 62 when a transfer means for the contact lens is inserted towards the bottom 4. On the other hand the conical configuration of the diaphragm 61 supports the interlocking of the fins 62 into the opposite axial direction and thus, a lens which is accommodated in the lower chamber 51, is prohibited from being washed out of the container accidentally when the container is agitated in a treatment solution. The flexible fins 61 of the retaining element 6 are provided with throughholes 63 which permit liquid in the upper chamber 52 and on the diaphragm 61 to flow into the lower chamber 51. When the container is lifted out of a treatment bath, the throughholes 63 and the conical shape of the diaphragm 61 facilitate the remaining liquid to flow off. Thus, an entertainment of liquid from one treatment bath to another is reduced if not avoided.

Figure 4:
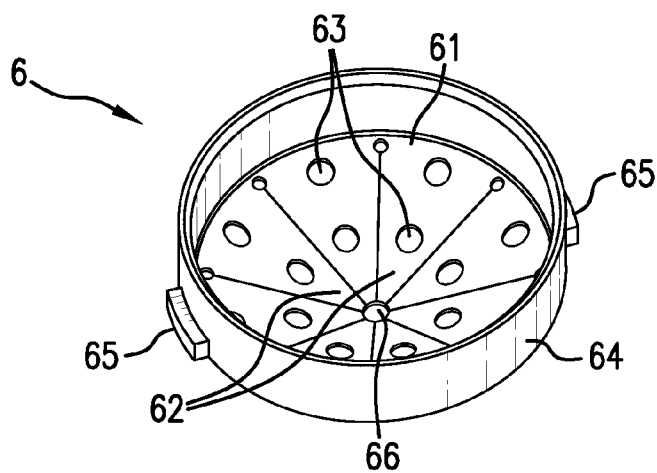
FIG. 4 is a perspective view of a retaining element.

In FIG. 4 an embodiment of the retaining element is generally designated with reference numeral 6. The retaining element 6 comprises a diaphragm 61 which extends across the cross-section of a cylindrical circumferential portion 64. The diaphragm 61 has a conical shape and is separated by diagonally extending slots into flexible fins 62. The flexible fins 62 have about triangular shape and extend from the circumferential portion 64 towards a central opening 66. Each flexible fin 62 is provided with throughholes 63. The circumferential portion 64 is provided with radially protruding lugs 65 which when mounted inside the tubular body 2 of the container 1 engage in corresponding apertures (32, FIG. 2).

The retaining element 6 is manufactured separately from the tubular body. The material for the retaining element 6 is selected in accordance with the solutions and chemicals used for the liquid treatment of the contact lenses and also depending on the required mechanical (elastic) properties thereof. It proves that an advantageous material which satisfies both, chemical and mechanical requirements, is Silicon.

The tubular body of the container according to the invention is made from a moldable plastic material, preferably Polyolefines, or PET, or mixtures thereof. An advantageous polyolefin which is compatible with the liquids used in the treatment of contact lenses is polypropylene. In accordance with the requirements of the treatment/extraction and/or rinsing and/or coating processes and the solutions applied other materials may be used for the manufacture of the tubular body. Established mass production processes for the tubular body are, e.g., injection molding, impact extrusion, or blow molding. In particular in cases of multi-layered tubular bodies blow molding proves to be a very convenient and inexpensive production method.

The invention claimed is:

1. A container for the accommodation of a contact lens during a treatment process comprising an elongated tubular body having a sidewall and at one longitudinal end thereof a bottom which protrudes convexly towards the outside of the tubular body, and an access opening at the opposite longitudinal end thereof, the bottom being provided with a number of apertures enabling a free flow of a liquid into and out of the tubular body, and having a retaining element which is located inside the tubular body, permitting access of a gripper into the tubular body towards the bottom thereof for insertion and removal of a contact lens, and enabling a circulation of the liquid inside the tubular body, but prohibiting the contact lens from being washed out of the tubular body; and the longitudinal end of the tubular body surrounding the access opening is provided with an annular flange, and wherein the sidewall of the tubular body, underneath the annular flange is provided with at least two resilient locking tabs.

2. The container according to claim 1, wherein the retaining element comprises a diaphragm having flexible fins which extend from a circumference towards the center thereof.

3. The container according to claim 2, wherein the flexible fins are formed by diagonal slots in the diaphragm.

4. The container according to claim 2, wherein the flexible fins are inclined towards the bottom of the tubular body.

5. The container according to claim 2, wherein the flexible fins are provided with throughholes enabling free passage of a liquid.

6. The container according to claim 1, wherein the apertures in the bottom of the tubular body comprise throughholes and longitudinal slots which extend from a transition of the bottom into the sidewall of the tubular body, towards the retaining element.

7. The container according to claim 6, wherein a total area of the longitudinal slots at least corresponds to an area covered by the throughholes in the convex bottom.

8. The container according to claim 1, wherein the diaphragm extends from a circumferential portion which, in the mounted state, rests against a cylindrical inside wall of the tubular body.

9. The container according to claim 8, wherein the cylindrical portion is provided with at least two lugs which protrude from the circumference thereof and, in the mounted state, lock in corresponding apertures in the sidewall of the tubular body.

10. The container according to claim 9, wherein the inside wall of the tubular body is provided with an annular shoulder for axially supporting the circumferential portion of the retaining element.

11. The container according to claim 1, wherein the tubular body is made from a moldable plastic material selected from polyolefins, polyesters, or mixtures thereof.

12. The container according to claim 11, wherein the tubular body is manufactured by one of injection molding, impact extrusion, or blow molding.

13. The container according to claim 1, wherein the retaining element is made from silicon.

14. The container according to claim 1, wherein the retaining element is formed integrally with the tubular body.

15. The container according to claim 14, wherein the tubular body and the retaining element are manufactured in a two-component injection molding process.

16. The container according to claim 1, wherein the treatment process is one or more treatment processes selected from extraction processes, rinsing processes or coating processes.

* * * * *